United States Patent [19]
Carbrey

[11] 3,852,619

[45] Dec. 3, 1974

[54] SIGNAL SHAPING CIRCUIT

[75] Inventor: Robert Lawrence Carbrey, Boulder, Colo.

[73] Assignee: Bell Telephone Laboratories Incorporated, Murray Hill, N.J.

[22] Filed: July 9, 1973

[21] Appl. No.: 377,590

[52] U.S. Cl. .................. 307/268, 307/264, 328/151, 38/162, 328/167, 333/28 R

[51] Int. Cl. .......................................... H03k 5/01

[58] Field of Search .................... 307/268, 238, 264; 328/151, 162, 165, 167; 330/9; 333/18, 28 R, 28 T

[56] References Cited

UNITED STATES PATENTS 3,621,286 11/1971 Varrasso ......................... 328/151 X 3,716,800 2/1973 DiRocco ............................. 328/151

*Primary Examiner*—John Zazworsky

*Attorney, Agent, or Firm*—J. S. Cubert

[57] ABSTRACT

In sample type signal processing and transmission systems, the periodic sample and hold of an input signal results in sampled signal distortion. A signal shaping circuit utilizes charge redistribution between first and second capacitors after each sampling to compensate for distortion. The first capacitor stores the present input signal sample after the prior shaping circuit output therein is transferred to the second capacitor through an amplifier. Selection of the ratio of storage capacitances and the amplifier gain makes the charge redistribution frequency dependent whereby sampled signal distortion is corrected.

22 Claims, 9 Drawing Figures

SIGNAL SHAPING CIRCUIT

BACKGROUND OF THE INVENTION

My invention relates to signal modifying arrangements in communication systems and more particularly to signal filters in transmission networks especially time division communication systems.

In communication systems, it is often desirable to periodically sample an input signal and to form a replica of said signal by extending the sampled amplitude to the next successive sampling instant. This sampling and hold technique may be utilized to convert analog signals to digital form for processing or may be used in signal transmission arrangements.

Time division communication systems utilize periodic signal sampling to exchange information between selected stations over a common communication bus. Selected stations are interconnected in a short time interval i.e., time slot which occurs in repetitive time frames so that a plurality of concurrent call connections may be completed over a single bus. In one type of time division communication system as set forth, for example, in my copending applications, Ser. No. 276,833 filed July 31, 1972, and Ser. No. 276,896, filed July 31, 1972, respectively, the sum of signal samples from a plurality of stations is obtained in a selected time slot and the sum is distributed to said stations to maintain signal exchanges in a call connection. The sum sample received less the receiving station's own contribution is stored and the stored sample is transferred to the receiving station. In this way a plurality of stations are interconnected in a single time slot by means of sample and hold signal transfers.

The holding of a sample signal as in the aforementioned arrangement, however, causes distortion in the signal transferred to the connected station. The distortion results from the band limiting inherent in the sample and hold process which, as is well known in the art, provides a sin $x/x$ type of response. Such distortion can be minimized by the insertion of an equalizer whose characteristics compensate for the sample and hold band limiting so that the transfer function of the cascaded sample and hold circuit and the equalizer results in satisfactory signal transmission. Generally known equalizer arrangements employ combinations of precisely determined passive components, time delay elements and amplifying devices. These equalizers are usually uneconomical and difficult to build. It is desirable to provide an economic equalizer devoid of precise components and time delay elements but compatible with sample and hold signal processing systems.

BRIEF SUMMARY OF THE INVENTION

My invention is a signal shaping circuit useful in time sampled transmission systems and comprising first and second storage devices, coupling means, and means for defining successively occurring time intervals in successive signal sampling periods. In one short time interval of each sampling period, the signal in the first storage device is transferred through the coupling means to the second storage device; and an input signal sample is separately placed in the first storage device. During the remainder of each sampling period, the first and second storage devices are interconnected whereby the signals in said storage devices are combined. The result of said signal combination is applied via the coupling means to the circuit output for the remainder of the sampling period. The circuit signal output is modified with respect to the input signal in accordance with the ratio of the storage device sizes and the coupling means transfer characteristics. Advantageously, the combination of the signal sample from the first storage device and the previous signal sample from the second storage device is frequency dependent and compensates the band limiting of the input signal sample applied to the shaping circuit.

According to one aspect of the invention, each of the first and second storage devices comprises a storage capacitor and the coupling means comprises an amplifier. During one time interval, the signal on the first capacitor is transferred through the amplifier to the second capacitor and the input signal sample is separately stored in the first capacitor. In the successive time interval, the first and second capacitors are interconnected to redistribute charge therebetween. The signal on the first capacitor resulting from the charge redistribution is applied to the circuit output via the amplifier for the remainder of the sampling period. The amplifier gain and the ratio of capacitor values are adjusted so that the redistribution is frequency sensitive and the signal at the circuit output is modified with respect to the input signal in a predetermined manner.

According to yet another aspect of the invention, a sample proportional to the signal in the first capacitor is applied to the second capacitor in a first short time interval and a sample of the input signal is applied to the first capacitor in a second short time interval. The charge redistribution between the first and second capacitors takes place at the beginning of a third time interval so that the equalized signal resulting from the charge redistribution is available on the amplifier output during almost the entire period between signal samples.

According to yet another aspect of the invention, the sample proportional to the signal in the first storage capacitor is applied to the second storage capacitor through the amplifier in a first short time interval. During the remainder of the period between signal samples, the input signal sample is applied to the first capacitor and the charge is redistributed between the first and second capacitors. The equalized signal on the first storage capacitor resulting from the charge redistribution is transferred through the amplifier to shaping circuit output.

According to yet another aspect of the invention, the ratio of the first storage capacitor to the second storage capacitor is a predetermined number and the amplifier is an inverting type amplifier.

According to yet another aspect of the invention, the predetermined number is $m > 2$ and the amplifier gain is $m + 1/m - 1$.

In one embodiment illustrative of the invention, the signal shaping circuit comprises first and second storage capacitors, an insulated gate field effect transistor (IGFET) amplifying device having its gate electrode connected to the first storage capacitor and its drain electrode connected to the shaping circuit output, and three IGFET switches. The first IGFET switch selectively connects the shaping circuit input to the first capacitor. The second IGFET switch selectively connects the IGFET amplifier drain electrode to the second capacitor and the third IGFET switch selectively interconnects the first and second capacitors. In the first interval of each sampling period, the second IGFET switch is closed and a sample proportional to the signal voltage in the first capacitor is applied to the second capacitor through the amplifying device. In a second interval of each sampling period, the first IGFET switch is closed and the sample of the input signal is applied to the first capacitor. The third IGFET switch is closed for the remainder of the sampling period whereby there is a redistribution of charge between the first and second capacitors. The equalized signal on the first capacitor resulting from the charge redistribution is applied to the IGFET amplifying device.

In another embodiment illustrative of the invention, the signal shaping circuit comprises first, second and third storage capacitors, an IGFET amplifier having its gate electrode connected to the second storage capacitor and its drain electrode connected to the shaping circuit output and first, second, third and fourth IGFET switches. During a first time interval of the sampled period, the first IGFET switch connected between the shaping circuit input and the first capacitor is closed and the second IGFET switch connected between the amplifying device drain electrode and the third capacitor is closed whereby a sample of the input signal is placed in the first capacitor and a sample proportional to the signal in the second capacitor is placed in the third capacitor. During the remainder of the sampling period, the first and second IGFET switches are open; the third IGFET switch connected between the first capacitor and the second capacitor is closed; and the fourth IGFET switch connected between the second and third capacitors is closed. The charge in the first and second capacitors and the third capacitor is redistributed and, the equalized signal in the second capacitor resulting from the charge redistribution is applied to the IGFET amplifying device.

DETAILED DESCRIPTION

Figure 1:
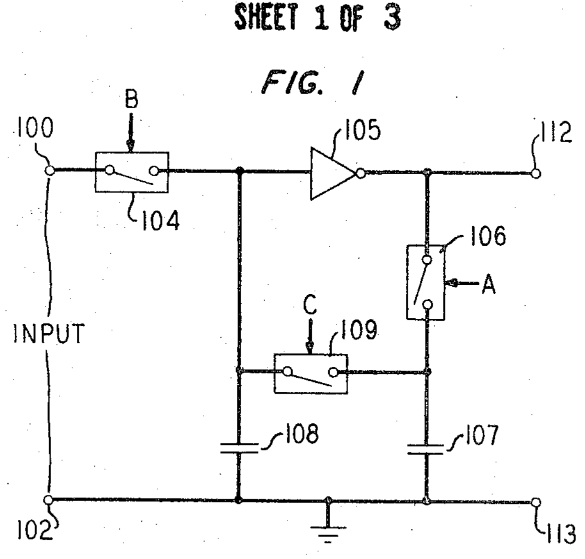
FIG. 1 depicts a general circuit diagram of an embodiment illustrative of the invention.
Figure 2:
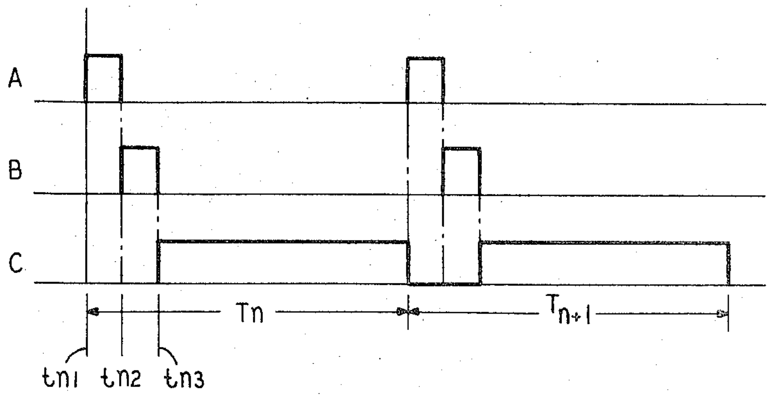
FIG. 2 shows waveforms useful in describing the circuit diagram of FIg. 1.

FIG. 1 shows an equalizer circuit in accordance with the invention comprising storage capacitors 107 and 108, amplifier 105 and switches 104, 106 and 109. An input signal which may comprise periodic samples or a continuous signal is applied between input terminals 100 and 102. Waveform A of FIG. 2 is the timing signal applied to switch 106. Waveform B of FIG. 2 is the timing signal applied to switch 104 and waveform C is the timing signal applied to switch 109. As shown in FIG. 2, timing signal waveforms A, B and C are successively applied during each sampling period. In sampling period Tn, waveform A is applied to input switch 106 between times *tn*1 and *tn*2. Waveform B is applied to switch 104 between times *tn*2 and *tn*3, and waveform C is applied to switch 109 from *tn*3 to the end of sampling period T*n*. The sequence of waveforms is repeated in sampling period *tn*+1 and in other sampling periods not shown.

Assume for purposes of illustration that capacitor 108 contains a signal $V_{n-1}$ just prior to the $n^{th}$ sampling of the input signal. At time *tn*1, signal A (FIG. 2) is applied to close switch 106 whereby the signal $V_{n-1}$ in storage capacitor 108 is coupled to storage capacitor 107 through amplifier 105 and switch 106. At time *tn*2, switch 106 is opened and switch 104 is closed responsive to signal B. In the interval between times *tn*2 and *tn*3, the input signal $e_n$ is applied from terminal 100 to capacitor 108 through closed switch 104. Thus, just prior to time *tn*3, capacitor 108 contains $e_n$ the present sample of the input signal and capacitor 107 contains the signal voltage $V_{n-1}$ resulting from the previous sampling period operation. At time *tn*3, switch 104 is opened and switch 109 is closed responsive to signal C whereby capacitors 107 and 108 are interconnected. In accordance with the well known principles of the electrical circuits, the charge on capacitors 107 and 108 is redistributed therebetween and the redistribution occurs very rapidly where the impedance of switch 109 is low.

In the circuit of FIG. 1, a signal proportional to the circuit output voltage of the previous sampling period is inverted and stored in capacitor 107 in a first short time interval. The current input sample is stored in capacitor 108 during a second short time interval and capacitors 107 and 108 are then interconnected. The redistribution of charge between capacitors 107 and 108 is frequency dependent so that the low frequency component and the component near the sampling frequency are attenuated while the components in between the low frequency component and the sampling frequency component are amplified in a predetermined manner. The amplifier gain and the ratio of capacitor 107 and 108 are selected to obtain the desired equalization response. The charge redistribution between a pair of coupled storage capacitors according to the invention allows signal components from all prior samplings to be included in the filter function.

Where $c_1$ is the value of capacitor 108, $c_2$ is the value of capacitor 107 and the gain of amplifier 105 is –G, the voltage on capacitor 108 after the redistribution of charge takes place just after *tn*3 is $$V_n = c_1 e_n - GC_2 V_{n-1}/C_1 + C_2 \quad (1).$$

Where $m$ is $c_1/c_2$ and en is the signal voltage transferred to capacitor 108 between time *tn*2 and *tn*3, the voltage on capacitor 108 is $$V_n = me_n - Gv_{n-1}/m+1 \quad (2).$$

More particularly if it is assumed that the signal voltage on capacitor 107 is zero volts at the time a first sample voltage $e_o$ is applied to capacitor 108 in sampling period To, the voltage on capacitor 108 after redistribution during the sampling period to is $$V_o = me_o/m+1 \quad (3).$$

After the second charge redistribution in the next sampling period T1, the voltage on capacitor 108 is $$v_1=\frac{me_1-\frac{Gme_o}{m+1}}{m+1}=\frac{me_1}{m+1}-\frac{Gme_o}{(m+1)^2} \quad (4)$$

After the third redistribution in sampling period *t*2, the voltage on capacitor 108 is $$v_2=\frac{me_2-G\frac{me_1}{m+1}-\frac{Gme_o}{(m+1)^2}}{m+1} \quad (5)$$

eq. 5 may be rewritten as $$v_2=\frac{me_2}{m+1}-\frac{mGe_1}{(m+1)^2}+\frac{mG^2e_o}{(m+1)^3}; \quad (6).$$

In general, when the redistribution is completed during sampling period Tn, the voltage on a capacitor 108 is $$v_n=\sum_{i=0}^{n}\frac{(-1)^i mG^i e_{n-i}}{(m+1)^{i+1}} \quad (7)$$

Where *i* denotes each sampling period from sampling period zero to sampling period *n*, eq. 7 represents the voltage on capacitor 108 after *n* sampling periods. The voltage between output terminals 112 and 113 is $-Gv_n$ since the gain of amplifier 105 is $-G$.

The gain of amplifier 105 may be determined in terms of *m* by assuming a constant signal applied between input terminals 100 and 102. For a constant input signal, the voltage on capacitor 108 after the redistribution of charge in the $n^{th}$ sampling period is $e_n/G$ and $e_n = Gv_{n-1}$. Under these conditions equation (1) becomes $$e_n/G = me_n - e_n/m+1 \quad (8)$$

$$G = m+1/m-1 \quad (9).$$

Thus G may be expressed in terms of *m*, the ratio of the capacitances of capacitors 108 and 107. Substituting the value for G obtained in eq. 9, the voltage $v_n$ on capacitor 108 after the $n^{th}$ redistribution of voltage is $$v_n=\frac{m}{m+1}\sum_{i=0}^{n}(-1)^i\left(\frac{e_{n-i}}{[m-1]^i}\right) \quad (10)$$

which converges for $m>2$.

Figure 3:
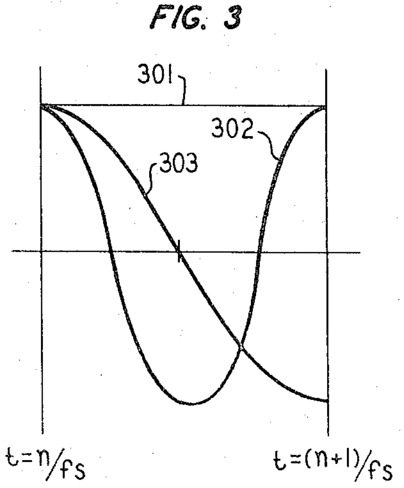
FIG. 3 shows waveforms illustrating different frequency components of an input signal applied to the circuit of FIG. 1.

FIG. 3 shows waveforms of frequency components of the input signal applied to the circuit of FIG. 1. Waveform 301 shows a d.c. signal component between two successive sampling times $t=n/fs$ and $t=(n+l\ l)/fs$. At time $t=n/fs$ and time $t=(n+1)/fs$, the sampled voltage on waveform 301 is the same. *fs* represents the sampling frequency. Eq. (10) includes the term $(-1)^i$ so that the summation of eq. (10) has terms of opposite signs as illustrated in equation (6) whereby the voltage $v_n$ is less than the sampled voltages shown on waveform 301 of FIG. 3. The circuit of FIG. 1 in accordance with transfer function expressed in equation 10 attenuates any d.c. component of the input signal.

Waveform 302 of FIG. 3 shows a sinewave signal component of frequency *fs*, the sampling frequency. At the successive sampling times $t=n/fs$ and $t=(n+1)/fs$, the sampled voltages on waveform 302 are also the same. In view of the alternating signs in eq. 10, the *fs* frequency component of the input signal is attenuated to the same degree as the d.c. component. The same attenuation response is obtained for frequency components which are integer submultiples of *fs*.

Figure 4:
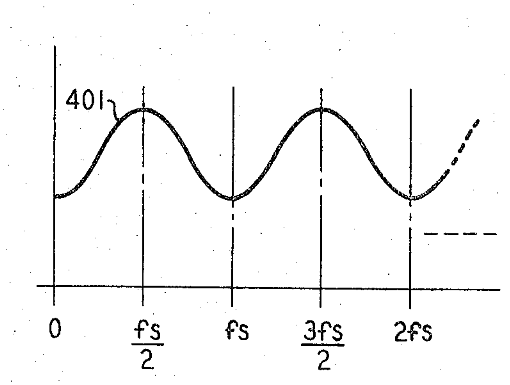
FIG. 4 shows the frequency response of the circuit of FIG. 1.

Waveform 303 represents the (**1/2*fs*) frequency component of the input signal applied to the circuit of FIG. 1. At time $t=n/fs$ the sample value of the (1/2*fs*) frequency component is positive while at the next sampling instant $t=(n+1)/fs$, the (1/2**)*fs* frequency component value is negative. In terms of the sequence in the summation of eq. 10, the successively sampled values of the (1/2)*fs* component of the input signal gives rise to all positive terms whereby the response of the circuit of FIG. 1 to the (1/2)*fs* frequency component is amplified rather than attenuated. Between the d.c. frequency component and (1/2)*fs* frequency component, the response of the circuit of FIG. 1 increases. The response of the circuit of FIG. 1 decreases between the (1/2)*fs* frequency component and the *fs* frequency component, FIG. 4 shows the response of the circuit of FIG. 1 as a function of frequency. At zero frequency and the sampling frequency *fs*, the response of the circuit is attenuated to the same minimum value. At the frequency component *fs*/2, the response of the circuit is maximum. Between frequency *fs* and **2*fs* and successive frequency intervals, the response of the circuit of FIG. 1** is repeated.

Figure 5:
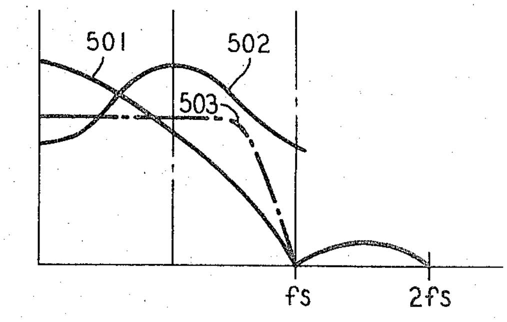
FIG. 5 shows frequency response waveforms useful in describing the circuit of FIG. 1.

Waveform 501 on FIG. 5 shows the frequency response of a zero hold sampling arrangement which occurs in the absence of the equalizer circuit of FIG. 1. As is well known in the art, this response is in the form of $$\sin x/x$$

Curve 501 shows the distortion obtained from a zero order sampling arrangement which the equalizer circuit of FIG. 1 is adapted to compensate. The frequency response of the equalizer circuit of FIG. 1 is shown in curve 502 and the frequency response obtained from a sampling arrangement in cascade with the circuit of FIG. 1 is the combination of curves 501 and 502 as shown in curve 503. Curve 503 exhibits a relatively flat response interval between 0 frequency and the sampling frequency *fs* which more closely approximates an idle low pass filter that is relatively distortionless. Thus, in accordance with the invention the insertion of the circuit of FIG. 1 in cascade with a zero order sampling arrangement compensates for the distortion resulting from the successive sampling of an input signal. Advantageously, the equalizer is not dependent on precise values of components, does not use time delay elements but is dependent only on the ratio *m* and the gain of the circuit amplifier.

To further illustrate the response of the circuit of FIG. 1, consider the case where the input signal has a d.c. component $E_1$, a sampling frequency component $E_2 \cos 2\pi fst$ and a one-half sampling frequency component $E_3 \cos \pi fst$. After a very large number of samples, when $n$ approaches infinity, the d.c. component may be evaluated from Equation (10) as $$E_{1n}=\frac{mE_1}{m+1}\sum_{i=0}^{\infty}\left(\frac{-1}{m-1}\right)^i \quad (11)$$

but as is well known $$\sum_{i=0}^{\infty}x^i=\frac{1}{1-x} \quad (12)$$

where $x = -1/m-1$ $$\sum_{i=0}^{\infty}\left(\frac{-1}{m-1}\right)^i=\frac{m-1}{m}. \quad (13)$$

Therefore $$E_{in} = m-1/m+1\ E_1. \quad (14)$$

For the sampling frequency component $E_2 \cos 2\pi fst$, the same result is obtained since at each sampling instant the sample is $E_2$. The sign of the one-half sampling frequency component, however, alternates at each sampling instant so that $x = 1/m-1$ $$\sum_{i=0}^{\infty}\left(\frac{1}{m-1}\right)^i=\frac{m-1}{m-2}. \quad (15)$$

Therefore $$E_{3n} = (m/m+1)\ (m-1/m-2)\ E_3 \quad (16)$$

where $m = 3$ and $E = E_1 = E_2 = E_3$, the response of the circuit of FIG. 1 to the d.c. component and the sampling frequency component is (1/2)E and the response to the one-half sampling frequency component is (3/2)E as illustrated in FIG. 4 and in curve 502 of FIG. 5.

Figure 6:
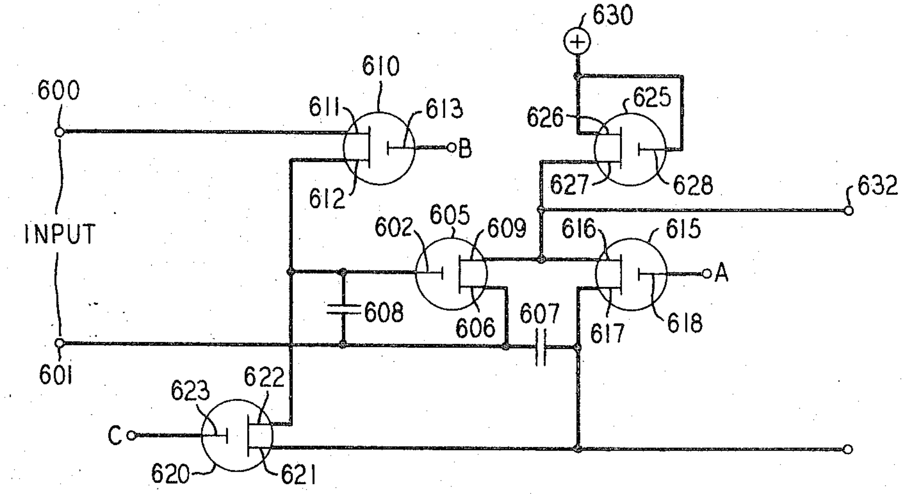
FIG. 6 depicts a schematic diagram of an equalizer circuit utilizing insulated gate field effect transistors (IGFET) and storage capacitors in accordance with the circuit of FIG. 1.

FIG. 6 shows one form of the circuit of FIG. 1 using an insulated gate field effect transistor amplifier and IGFET switches. This form is applicable to integrated circuit technology. In FIG. 6, capacitors 607 and 608 correspond to capacitors 107 and 108 of FIG. 1, respectively. N-type IGFET switches 615, 610 and 620 correspond to switches 106, 104 and 109 of FIG. 1, respectively. The amplitude of the control signals applied to the IGFET switches must be greater than the signals on the sources or drains to insure conduction when the IGFETs are closed. IGFET amplifier 605 corresponds to amplifier 105 of FIG. 1 and IGFET 625 provides a load impedance for amplifier 605 that, as is well known in the art, compensates for the nonlinear response of IGFET amplifier 605.

When signal A (FIG. 2) is applied to gate electrode 618 of IGFET 615 during a sampling period, a conductive path is established between drain electrode 616 and source electrode 617 and the signal stored in capacitor 608 applied to gate electrode 602 is inverted and transferred via drain electrode 609 and the source drain path of IGFET 615 to capacitor 607. Upon termination of signal A, IGFET switch 615 is opened and responsive to signal B (FIG. 2) applied to gate electrode 613, a conductive path is established between drain electrode 611 and source electrode 612 of IGFET 610. Thus, a sample of the input signal applied between terminals 600 and 601 is stored in capacitor 608.

When signal B is removed, IGFET 610 is opened and signal C is applied to IGFET 620. Responsive to signal C, a conductive path is established between drain electrode 621 and source electrode 622 whereby capacitor 607 is connected to capacitor 608. Charge redistribution now occurs between capacitors 607 and 608. The result of the charge redistribution stored on capacitor 608 is applied to gate electrode 602. According to the well-known principles of IGFET operation, an amplified and inverted form of the redistribution signal of the form of equation (10) on capacitor 608 is available at output terminal 632. In this way, the equalizer function is performed in accordance with the invention. It is to be understood that components other than IGFETs may be used to obtain the filtering functions and that a feedback amplifier known in the art, may be used to insure circuit stability.

Figure 7:
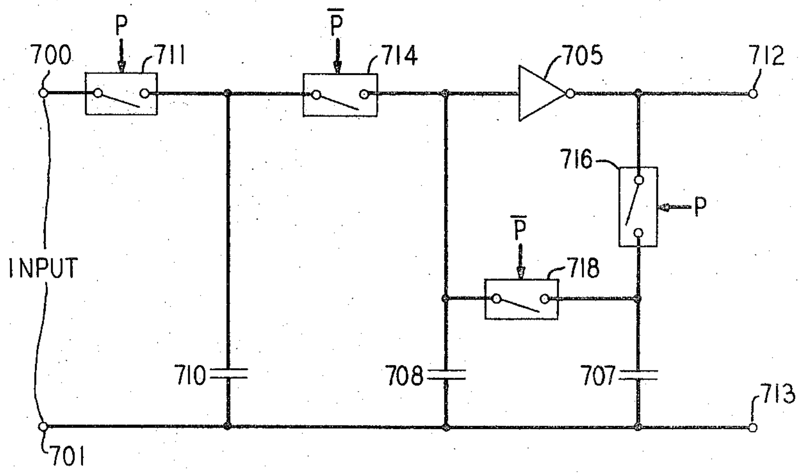
FIG. 7 depicts a general circuit diagram of another embodiment illustrative of the invention.
Figure 8:
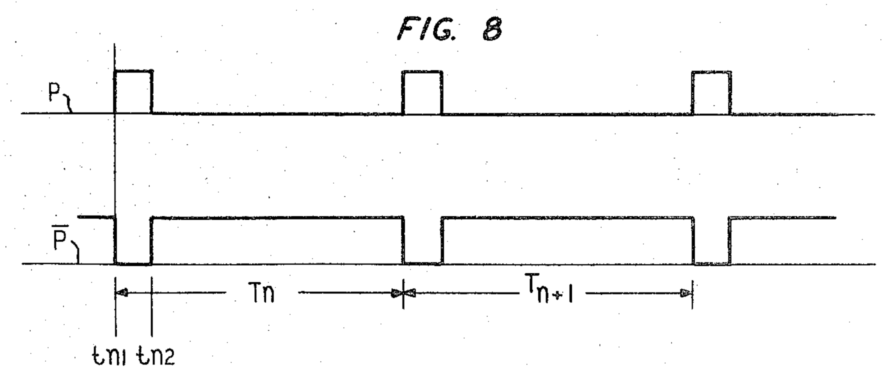
FIG. 8 shows waveforms useful in describing the circuit of FIG. 7.

FIG. 7 shows another form of the equalizer circuit in accordance with the invention wherein a two-phase control pulse generator is utilized. In FIG. 7, capacitor 710 receives a sample of the input signal via switch 711 responsive to control signal P occurring between times $tn1$ and $tn2$ (FIG. 8). At the same time responsive to signal P applied to switch 716, the signal in capacitor 708 is inverted and transferred to capacitor 707 via amplifier 705 and switch 716. Upon termination of signal P at time $tn2$, signal P is applied to switches 714 and 718. At this time, switches 711 and 716 are opened and switches 714 and 718 are closed. Switches 714 and 718 remain closed for the remainder of the sampling period.

Switch 714 permits the sampled signal in capacitor 710 to be transferred to capacitor 708. Where capacitor 708 is small compared with capacitor 710, substantially the entire sampled signal voltage in capacitor 710 appears on capacitor 708. Switch 718 is also closed responsive to signal P so that charge redistribution takes place between capacitor 707 containing the circuit output of the previous sampling period, and capacitors 710 and 708 containing the present sample of the input signal. As a result of the charge redistribution, the signal voltage on capacitor 708 follows the response of Equation (10) shown in FIG. 4 and this equalized signal is inverted and applied to output 712 via amplifer 705. In equation (10), $C_1$ represents the capacitance of parallel connected capacitors 708 and 710 and $C_2$ represents the capacitance of capacitor 707.

Figure 9:
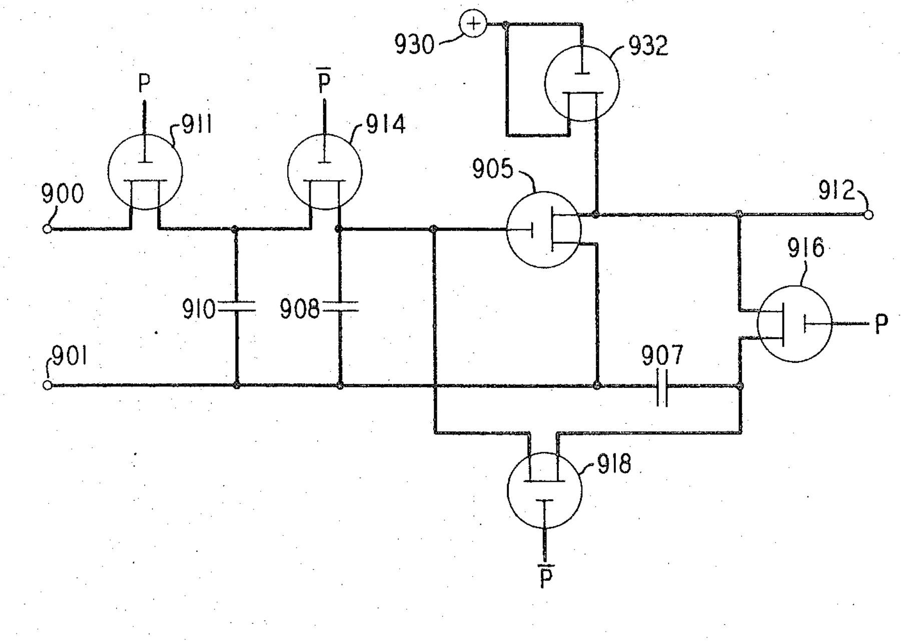
FIG. 9 shows a schematic diagram of an equalizer circuit utilizing IGFETs and storage capacitors in accordance with the circuit of FIG. 7.

FIG. 9 shows a schematic diagram of the circuit of FIG. 7 utilizing IGFET switches and an IGFET amplifier in which IGFET amplifier 905 corresponds to amplifier 705 and IGFET switches 911, 914, 916 and 918 correspond to switches 711, 714, 716 and 718, respectively, of FIG. 7. IGFET 932 is a load impedance for IGFET amplifier 905 and, as is well known in the art, compensates for the nonlinear response obtained from amplifying device 905.

IGFET amplifier 905 is biased in its linear range by positive voltage source 930 via IGFET 932. Between times $tn1$ and $tn2$ of sampling period $Tn$ on FIG. 8, control signal P is applied to IGFET switches 911 and 916. In this interval, a sample of the input signal is transferred to capacitor 910 via closed IGFET switch 911 and the signal stored in capacitor 908 as a result of the operations in the previous sampling period is transferred via amplifier 905 and closed IGFET switch 916 to capacitor 907. At time $tn2$, switches 911 and 916 are opened responsive to the termination of control signal P and switches 914 and 916 are closed responsive to control signal P which occurs in the interval between $tn2$ and the end of sampling period $Tn$. Since capacitor 908 is small compared to capacitor 910, substantially the entire sampled signal voltage on capacitor 910 is immediately transferred to capacitor 908 and charge redistribution occurs between capacitor 907 and capacitors 908 and 910. The resulting signal voltage on capacitor 908 in accordance with Equation (10) is applied to the gate of IGFET amplifier 905 and an inverted and amplified version of the signal voltage on capacitor 908 is available at output terminal 912. The equalized signal from the previous sampling is available when control signal P is applied. The charge redistribution is completed in a very short time interval so that the equalized output signal is available for almost the entire sampling interval and during the occurrence of the control signal P of the next sampling interval.

What is claimed is:

1. A signal shaping circuit comprising means for receiving samples of an input signal in periodically recurring time intervals, first and second storing means, coupling means having an input connected to said first storing means and an output, first means for applying the signal in said first storing means to said second storing means through said coupling means during a first portion of said time interval, second means for separately applying a sample of said input signal from said receiving means to said first storing means during said first portion, and third means operative during the remainder of said time interval for interconnecting said first and second storing means to combine the signal sample in said first storing means with the coupled signal previously applied to said second storing means whereby the signal at said coupling means output is modified in a predetermined manner with respect to said input signal.

2. A shaping circuit according to claim 1 wherein each of said first and second storing means comprises a storage capacitor and said coupling means comprises amplifying means.

3. A signal shaping circuit according to claim 2 wherein said first means comprises switching means for connecting the output of said amplifying means to said second storage capacitor during one part of said time interval first portion, said second means comprises switching means for connecting said receiving means to said first storage capacitor during a succeeding part of said time interval first portion, and said third means comprises switching means for connecting said first storage capacitor to said second storage capacitor during the remainder of said time interval.

4. A signal equalizer circuit comprising means for receiving a sample of an input signal during a selected time slot of a group of periodically recurring time slots, first and second storage capacitors, amplifying means having an input connected to said first storage capacitor and an output, means for generating first, second and third successively occurring periodic control signals, first, second and third switches each having a first, a second and a control electrode, said first switching means having its first electrode connected to said amplifying means output and its second electrode connected to said second storage capacitor and being responsive to said first occurring control signal applied to its control electrode to connect said amplifying means output to said second storage capacitor, said second switch having its first electrode connected to said receiving means and its second electrode connected to said first storage capacitor and being responsive to said second occurring control signal for connecting said receiving means to said first storage capacitor, and said third switch having its first electrode connected to said first storage capacitor and its second electrode connected to said second storage capacitor and being responsive to said third occurring control signal for connecting said first storage capacitor to said second storage capacitor whereby the signal at said amplifying means output is modified in a predetermined manner with respect to said input signal.

5. A signal equalizer circuit according to claim 4 wherein the ratio of said first storage capacitor to said second storage capacitor is a predetermined number and said amplifying means comprises an inverting amplifier.

6. A signal equalizer circuit according to claim 5 wherein said predetermined number is $m > 2$ and the gain of said inverting amplifier is $m+1/m-1$.

7. A signal equalizer circuit according to claim 6 wherein each of said first, second and third switches comprises an insulated gate field effect transistor having a gate, a source and a drain, said gate corresponding to said switch control electrode, said drain corresponding to said switch first electrode and said source corresponding to said switch second electrode.

8. A signal equalizer circuit according to claim 7 wherein said inverting amplifier comprises an IGFET having a gate, a source and a drain, said gate being the amplifier input, said drain being the amplifier output and said source being connected to a reference potential.

9. A signal shaping circuit comprising means for receiving samples of an input signal in periodically occurring time intervals, first, second and third stores, coupling means having an input connected to said second store and an output, means for generating first and second successively occurring control signals in each time interval, first means connected between said receiving means and said first store responsive to said first control signal for applying a sample of said input signal to said first store, second means connected between said coupling means output and said third store responsive to said first control signal for applying the signal obtained from said second store to said third store, third means connected between said first and second stores responsive to said second control signal for interconnecting said first and second stores, and fourth means connected between said second and third stores responsive to said second control signal for interconnecting said first and second stores with said third store to combine the signals in said first and second stores with the coupled signal previously applied to said third store whereby the signal at said coupling means output is modified in a predetermined manner with respect to said input signal.

10. A shaping circuit according to claim 9 wherein each of said first, second and third stores comprises a storage capacitor and said coupling means comprises amplifying means.

11. A signal shaping circuit according to claim 10 wherein each of said first, second, third and fourth means comprises switching means, and said control signal generating means comprising means for generating a short first control signal at the beginning of each time interval and means for generating said second control signal for the remainder of the time interval.

12. A signal equalizer circuit comprising means for receiving a sample of an input signal during a selected time slot of a group of periodically recurring time slots, first, second and third storage capacitors, amplifying means having an input connected to said second storage capacitor and an output, means for generating first and second successively occurring periodic control signals, first, second, third and fourth switches each having first, second and control electrodes, said first switch having its first electrode connected to said signal receiving means and its second electrode connected to said first storage capacitor and being responsive to said first control signal applied to its control electrode for connecting said receiving means to said first storage capacitor, said second switch having its first electrode connected to said amplifing means output and its second electrode connected to said third storage capacitor and being responsive to said first control signal applied to its control electrode for connecting said amplifying means output to said third storage capacitor, said third switch having its first electrode connected to said first storage capacitor and its second electrode connected to said second storage capacitor and being responsive to said second control signal applied to its control electrode for interconnecting said first and second storage capacitors, and said fourth switch having its first electrode connected to said third storage capacitor and its second electrode connected to said storage capacitor and being responsive to the second control signal applied to its control electrode for interconnecting said second and third storage capacitors whereby the signal at said amplifying means output is modified in a predetermined manner with respect to said input signal.

13. A signal equalizer circuit according to claim 12 wherein said second storage capacitor is much smaller than said first storage capacitor, the ratio of the sum of said first and second storage capacitors to said third storage capacitor is a predetermined number and said amplifying means comprises an inverting amplifier.

14. A signal equalizer circuit according to claim 13 wherein said predetermined number is $m > 2$ and the gain of said inverting amplifier is $m+1/m-1$.

15. A signal equalizer circuit according to claim 14 wherein each of said first, second, third and fourth switches comprises an IGFET having a gate, a source and a drain, said gate corresponding to said switch control electrode, said drain corresponding to said switch first electrode and said source corresponding to said switch second electrode.

16. A signal equalizer circuit according to claim 15 wherein said inverting amplifier comprises an IGFET having a gate, a drain and a source, said gate being the amplifier input, said drain being the amplifier output and said source being connected to a reference potential.

17. In a time division communication system wherein a plurality of time slots occurs in repetitive frames and having means for receiving a sample of an input signal in a selected time slot, a filter circuit comprising first, second and third storage capacitors, amplifying means having an input connected to said second storage capacitor and an output, apparatus operative during said selected time slot comprising first means for applying said input signal sample to said first storage capacitor and second means for applying the amplified contents of said second storage capacitor to said third storage capacitor, and apparatus operative between successive occurrences of said selected time slot comprising means for interconnecting said first and second storage capacitors and means for interconnecting said second and third storage capacitors to redistribute charge between said first and second capacitors and said third capacitor whereby the signal at the amplifying means output is modified in a predetermined manner with respect to said input signal.

18. In a time division communication system wherein a plurality of time slots occurs in repetitive frames and having means for receiving a sample of an input signal in a selected time slot, a filter circuit according to claim 17 wherein said first means comprises a switch connected between said signal receiving means and said first storage capacitor, said second means comprises a switch connected between said amplifying means output and said third storage capacitor, said third means comprises a switch connected between said first and second storage capacitors, said fourth means comprises a switch connected between said second and third storage capacitors, and said amplifying means comprises an inverting amplifier.

19. In a time division communication system wherein a plurality of time slots occurs in repetitive frames and having means for receiving a sample of an input signal in a selected time slot, a filter circuit according to claim 18 wherein said second storage capacitor is much smaller than said first storage capacitor, the ratio of the sum of said first and second storage capacitors to said third storage capacitor is a predetermined number $m > 2$ and the gain of said amplifier is $m+1/m-1$.

20. In a signal transmission system having a zero order hold sampling arrangement, a signal equalizer circuit comprising means for periodically sampling the output of said zero order hold arrangement, first and second capacitors, an inverting amplifier having an input connected to said first capacitor and an output, means operative just prior to the sampling of said zero order hold arrangement for applying a signal corresponding to the signal stored in said first capacitor from said amplifier output to said second storage capacitor, means operative during said sampling for applying the sample from the zero order holding arrangement to said first capacitor, and means operative just after said sampling for interconnecting said first and second storage capacitors to redistribute charge therebetween whereby said amplifier output signal is modified in a predetermined manner with respect to said sample input.

21. A signal shaping circuit comprising means for periodically sampling an input signal, first and second storing means, coupling means having an input connected to said first storing means and an output, first means for applying the contents of said first storing means to said second storing means via said coupling means, second means for applying the sample of said input signal to said first storing means, and third means for combining the sampled signal in said first storing means with the contents of said second storing means whereby the output of said coupling means is modified in a predetermined manner with respect to said sampled input signal.

22. A signal shaping circuit according to claim 21 wherein each of said first and second storing means comprises a storage capacitor and said third means comprises means for redistributing the charge in said first storage capacitor corresponding to said sampled signal with the charge in said second storage capacitor.

* * * * *

UNITED STATES PATENT OFFICE
CERTIFICATE OF CORRECTION

PATENT NO. : 3,852,619

DATED : December 3, 1974

INVENTOR(S) : Robert Lawrence Carbrey

It is certified that error appears in the above-identified patent and that said Letters Patent are hereby corrected as shown below:

Column 4, line 11, change "$tn_{+}1$" to --$T_{n+1}$--.

Column 5, line 66, change "t=(n+11)/fs" to --t=(n+1)/fs--.

Column 8, line 31, change "P" to --$\overline{P}$--;

line 41, change "P" to --$\overline{P}$--.

Column 9, line 6, change "P" to --$\overline{P}$--.

Column 11, line 35, before "storage" insert --second--.

Signed and sealed this 1st day of July 1975.

(SEAL)
Attest:

RUTH C. MASON
Attesting Officer

C. MARSHALL DANN
Commissioner of Patents
and Trademarks